(12) United States Patent
Kaemmerer et al.

(10) Patent No.: US 10,760,671 B2
(45) Date of Patent: Sep. 1, 2020

(54) SPUR GEAR TRANSMISSION (71) Applicant: VOITH PATENT GMBH, Heidenheim (DE)

(72) Inventors: Steffen Kaemmerer, Immenstadt-Eckarts (DE); Philipp Zemella, Northeim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/283,104

(22) Filed: Feb. 22, 2019

(65) Prior Publication Data

US 2019/0195335 A1     Jun. 27, 2019

Related U.S. Application Data

(62) Division of application No. 15/312,890, filed as application No. PCT/EP2015/061359 on May 22, 2015, now Pat. No. 10,378,640.

(30) Foreign Application Priority Data

May 23, 2014   (DE) .......................... 10 2014 209 922

(51) Int. Cl.
  *F16H 1/12*      (2006.01)
  *F16H 1/20*      (2006.01)
  (Continued)

(52) U.S. Cl.
  CPC .......... *F16H 57/0409* (2013.01); *F16H 1/06* (2013.01); *F16H 57/0415* (2013.01);
  (Continued)

(58) Field of Classification Search
  CPC ............ F16H 57/0423; F16H 57/0495; F16H 57/0409; F16H 57/0436; F16H 57/0415; F16H 57/0416; F16H 57/0417
  See application file for complete search history.

(56) References Cited

U.S. PATENT DOCUMENTS

| 2,017,871 | A | 10/1935 | Strain | F16H 57/0463 184/109 |
| 2,214,485 | A * | 9/1940 | Short | F16H 57/0421 184/6.12 |

(Continued)

FOREIGN PATENT DOCUMENTS

| DE | 19860353 C1 | 6/2000 |
| DE | 102006022964 A1 | 11/2007 |

(Continued)

*Primary Examiner* — Jake Cook
(74) *Attorney, Agent, or Firm* — Laurence A. Greenberg; Werner H. Stemer; Ralph E. Locher (57) ABSTRACT

A spur gear transmission has at least two meshing, toothed spur gears. A covering wall surrounds the spur gears circumferentially and in the direction of their rotational axes. The covering wall has an inner contour adapted to the outer diameters of the spur gears. Two annular gaps which transition into each other are formed between the covering wall and the spur gears. The annular gap is substantially concentric to a rotational axis. The covering wall surrounds the two spur gears circumferentially only over a part of the circumference, with a part of the outer circumference of the two spur gears or one of the two spur gears protruding outwards out of the covering wall. The part of the two spur gears or of the one spur gear that protrudes out of the covering wall is positioned on the lower face of the spur gears.

26 Claims, 3 Drawing Sheets

(51) Int. Cl.
*F16H 57/04* (2010.01)
*F16H 1/06* (2006.01)

(52) U.S. Cl.
CPC ..... *F16H 57/0416* (2013.01); *F16H 57/0417* (2013.01); *F16H 57/0423* (2013.01); *F16H 57/0436* (2013.01); *F16H 57/0456* (2013.01); *F16H 57/0495* (2013.01)

(56) References Cited

U.S. PATENT DOCUMENTS

| | | | |
|---|---|---|---|
| 2,645,305 A | 7/1953 | Roos | |
| 3,489,034 A | 1/1970 | Moore | |
| 3,601,515 A | 8/1971 | Pelizzoni | |
| 4,778,000 A | 10/1988 | Maas | F04D 29/4226 165/47 |
| 5,048,370 A | 9/1991 | Duello | |
| 5,950,501 A | 9/1999 | Deeg et al. | |
| 6,374,949 B2 | 4/2002 | Schwertberger | |
| 8,739,930 B2 | 6/2014 | Boenning et al. | |
| 8,991,557 B2 | 3/2015 | Arisawa et al. | |
| 2013/0025405 A1 | 1/2013 | Arisawa et al. | |
| 2013/0233107 A1 | 9/2013 | Von Wilmowsky et al. | |
| 2014/0054114 A1 | 2/2014 | Isomura et al. | |
| 2014/0245845 A1* | 9/2014 | Evarts | B06B 1/16 74/61 |

FOREIGN PATENT DOCUMENTS

| | | |
|---|---|---|
| DE | 102007041318 A1 | 3/2009 |
| EP | 2535618 A1 | 12/2012 |
| GB | 2922540 A | 9/1928 |
| GB | 458379 A | 12/1936 |
| GB | 681298 A | 10/1952 |
| GB | 1426352 A | 2/1976 |
| JP | 2011163365 A | 8/2011 |
| WO | 2012028231 A1 | 3/2012 |

* cited by examiner

SPUR GEAR TRANSMISSION

CROSS-REFERENCE TO RELATED APPLICATION

This application is a divisional of patent application Ser. No. 15/312,890, filed Nov. 21, 2016; which was a § 371 national stage filing of international application No. PCT/EP2015/061359, filed May 22, 2015, which designated the United States; this application also claims the priority, under 35 U.S.C. § 119, of German patent application No. 10 2014 209 922.6, filed May 23, 2014; the prior applications are herewith incorporated by reference in their entirety.

BACKGROUND OF THE INVENTION

Field of the Invention

The present invention relates to a spur gear transmission with at least two toothed spur gears, in particular according to the preamble of the independent claims.

Spur gear transmissions of the type in question are known, for example, from WO 2012/028231 A1. Such spur gear transmissions are designed, for example, as high-speed transmissions, such as turbo transmissions.

Particularly in the case of such high-speed transmissions, such as turbo transmissions, the swirling of the air-oil mixture in the interior space of the transmission housing causes losses which are undesirable. Various measures are known for reducing the losses. One measure makes provision to subject the interior space of the transmission housing to evacuation by suction by means of a vacuum pump such that the pressure in the interior space is lower than that of the surroundings outside the transmission housing.

Another measure which is intended to avoid such evacuation of the transmission housing by suction is presented in WO 2012/028231 A1 referred to at the beginning, namely the provision of a covering wall lying closely around the spur gears, the covering wall surrounding the spur gears in the circumferential direction except for an inlet gap and optionally an outlet gap which is positioned outside the outer circumference of the spur gears. This encapsulation of the spur gears by the covering wall has also been provided in order to produce a negative pressure in the region of the outer diameter of the spur gears or in the region of the toothings thereof, which reduces the losses.

The two known measures are therefore based on the assumption that as low a pressure as possible, that is to say, as great a vacuum as possible has to be produced in the region of the peripheral toothings of the spur gears in order to reduce the power losses. Correspondingly complicated measures for substantial sealing or comparatively powerful and therefore expensive and energy-intensive vacuum pumps have therefore been provided in order to optimize the vacuum as far as possible. These measures are associated with undesirable costs.

DE 198 60 353 C1 discloses a spur gear transmission in which the spur gears are surrounded by an additional interior housing which is fastened within a main housing. A partial vacuum is produced in the interior space of the interior housing by means of a pump. The space between the interior housing and the main housing is under atmospheric pressure. The spur gears do not protrude outward out of the interior housing, but are surrounded by the latter at a distance, and therefore annular gaps merging into one another are also not produced.

DE 10 2006 022 964 A1 describes a fluid equalizing container and a transmission equipped therewith. The fluid equalizing container surrounds the spur gears laterally over a part of their circumference.

DE 10 2007 041 318 A1 describes a manual transmission with a gear pump, wherein the gear pump is an external gear pump and has two gear wheels which mesh with each other and of which one belongs to one of the sets of gears in the transmission. In order to form a pump gap, an additional housing is provided below the gear wheels, the housing extending partially over the circumference of the gear wheels.

GB 292 540 A describes gear wheels revolving at a high rotational speed in a housing, which gear wheels are assigned a special guide in order to improve the lubrication of the gear wheels. The guide partially surrounds the gear wheels and is at least closed on the lower side in such a manner that the gear wheels do not protrude out of the guide.

GB 1 426 352 A describes a lubricating device for gear wheels, in which a partially open interior housing is likewise provided, the interior housing closely surrounding the gear wheels on their lower side and on a lateral side.

GB 458 379 A discloses an air pump which is integrated in a transmission. The air pump has guide arcs which enclose the gear wheels on the end sides thereof.

US 2014/0054114 A1 discloses a lubricating oil supply for a transmission, in which a covering completely surrounds the pinion of two spur gears and surrounds the other gear wheel of the two spur gears over half of the circumference.

U.S. Pat. No. 5,950,501 A presents a spur gear transmission, the interior housing of which surrounds the gear wheels at a certain distance and is evacuated by means of a pump or is filled with a gas. Annular gaps merging into one another are not provided and the spur gears do not protrude out of the interior housing.

U.S. Pat. No. 2,645,305 A describes a lubricating device for spur gears of a transmission, with a lateral shielding of the spur gears, the shielding protruding only over a small part of the outer circumference of the spur gears.

EP 2 535 618 A1 discloses spur gears which are surrounded by housings but which do not protrude out of the housings.

WO 2012/028231 A1 discloses a gear transmission with a covering wall which surrounds at least one of two gear wheels cooperating with each other, and partially or completely blocks off the surrounded interior space from the surroundings. The gear wheels do not protrude out of the covering wall.

JP 2011-163365 A discloses a gear transmission with an oil duct which partially molds to the shape of the gear wheels.

BRIEF SUMMARY OF THE INVENTION

The present invention is based on the object of further developing a spur gear transmission of the type referred to at the beginning in such a manner that high efficiency is achieved with low production and maintenance costs, that is to say, the measures for reducing the power loss are intended firstly to be efficient and secondly to be cost-effective.

The object according to the invention is achieved by a spur gear transmission according to the independent claims. Advantageous and particularly expedient refinements of the invention are specified in the dependent claims.

A spur gear transmission according to the invention has at least two toothed spur gears, the toothings of which are in meshing engagement with each other, wherein the two spur gears are each rotatable via an axis of rotation. The spur gear transmission has a covering wall which surrounds the two spur gears in the circumferential direction and in the direction of the axes of rotation, wherein the covering wall has an inner contour which is adapted to the outer diameters of the spur gears in such a manner that two annular gaps which merge into each other are produced between the covering wall and the spur gears, wherein one annular gap is arranged at least substantially concentrically with respect to each axis of rotation.

According to a first embodiment according to the invention, the covering wall surrounds the two spur gears in the circumferential direction only over a part of the circumference thereof such that a part of the outer circumference of the two spur gears or of at least one of the two spur gears protrudes outward out of the covering wall. Said part of the circumference which protrudes outward out of the covering wall therefore lies freely in relation to the surroundings of the covering wall, for example in relation to an interior space of a transmission housing of the spur gear transmission. Accordingly, a complete encapsulation of the spur gears, as in the cited prior art, is not provided. When the two spur gears are positioned next to each other, that part of the circumference which protrudes outward out of the covering wall lies outside a projection surface which is formed by a cross section perpendicular to the axis of rotation of the spur gears through those parts of the covering wall which are positioned along the outer circumference of the spur gears. In other words, the covering wall not only has an opening over the circumference of the spur gears, through which opening the spur gears are visibly connected, as it were, to the surroundings of the covering wall, but the spur gears actually protrude out of a corresponding opening in the covering wall and project beyond said opening. If the two spur gears are positioned one above the other, the lower spur gear correspondingly protrudes downward beyond a horizontal plane in which the covering wall extending downward from the upper spur gear to the lower spur gear ends.

That part of the two spur gears or of the one spur gear which protrudes out of the covering wall is positioned on the lower side of the spur gears, that is to say, during the operation of the spur gear transmission, in the direction of an oil sump which accumulates at the bottom in the spur gear transmission because of gravity. By contrast, on their opposite, upper side, the spur gears are advantageously completely surrounded by the covering wall, in particular over at least the upper half of the circumference of the respective spur gear, wherein the upper half is closed at the bottom in particular by a horizontal, that is to say, the covering wall ends on its lower side in a horizontal plane. If the spur gears are positioned one above the other, wherein in particular precisely two spur gears are provided, of which the one is positioned over the other, the lower spur gear, for example, can be surrounded beginning at least substantially at the level of its axis of rotation or else there below over an arc of at least approximately at least 90° and the upper spur gear is then advantageously surrounded by the covering wall by more than 180°, in particular by substantially 270°, beginning next to the engagement region of the two toothings and, over the further course, upward beyond the apex of the upper spur gear onto the opposite side until again downward at least substantially level with the axis of rotation of the upper spur gear.

That part of the spur gears which protrudes downward out of the covering wall, that part of the lower spur gear which protrudes downward when the spur gears are positioned one above the other, is advantageously freely positioned above an oil sump in the transmission, in particular at a distance from the oil sump or from a lower wall of the transmission housing, wherein the distance is advantageously a multiple of the distance between the covering wall and the surrounded region of the spur gear or of the spur gears.

However, the invention can also be used with the corresponding measure in a transmission in which an oil sump is provided outside the transmission housing, or a corresponding oil sump can be dispensed with for another suitable means of lubrication.

The two spur gears are advantageously positioned next to each other with their axes of rotation in the horizontal direction of the spur gear transmission, wherein the axes of rotation run in particular within a common horizontal plane. The plane is in particular at the bottom in the spur gear transmission parallel to the surface of an oil sump.

The covering wall advantageously surrounds the two spur gears completely over their upper half and furthermore over a part of the lower half, as viewed in a cross section through a vertical plane perpendicular to the axes of rotation of the spur gears. The two parts of the covering which protrude beyond the upper half can be designed to taper in their cross section in particular at their free end.

According to an embodiment of the invention, the gap or annular gap between the covering and the outer diameter of the spur gears is designed to taper at the free end of the covering. This can be provided at one free end or both free ends of the covering. Such a reduction in the annular gap in relation to the remaining region of the annular gap brings about a sealing which prevents or reduces an undesirable exit and/or entry of oil from/into the annular gap.

According to an embodiment of the invention, the region of the meshing of the spur gears, in particular on the upper side of the two spur gears, is provided to be free from a covering, or a corresponding window is provided in the covering.

The first embodiment according to the invention is based on the finding that a reduction in the power loss can be brought about not only by producing a negative pressure or vacuum in the region of the toothings of the peripheral spur gears, but in that a thin layer of a medium low in lubricating substance, in particular low in lubricating oil, in practice forms around the spur gears since the lubricant, in particular the oil, is thrown outward by the centrifugal force. Such a layer or lamination is stabilized by the covering wall, wherein it can be determined by specific selection of the thickness of the annular gaps that there can be a comparatively oil-richer medium outside the covering wall, whereas a medium low in oil is present within the covering wall, i.e. in the annular gaps between the spur gears and the covering wall. It is therefore prevented, even without full encapsulation or without an applied vacuum, that medium rich in lubricating substance passes to the spur gears, said medium having to be accelerated and therefore increasing the power consumption of the spur gears.

The first solution according to the invention does not exclude the fact that a negative pressure is additionally provided in the interior space of the transmission housing which surrounds the covering wall, that is to say that a lower pressure prevails in the interior space than in the surroundings of the transmission housing. Such a negative pressure can be produced, for example, by means of an external or integrated vacuum pump, the suction side of which is connected to the interior space. With such reduced ambient pressure of the covering wall, the power consumption can be reduced even further by the partially encapsulated interior housing, that is to say with the covering wall according to the invention. Also in comparison to an embodiment with the transmission-housing interior space evacuated by suction and without encapsulation of the spur gears, that is to say without provision of a covering wall, the power loss of the embodiment according to the invention with a partial or complete encapsulation of the spur gears, wherein the latter will also be discussed below, and with an additionally pressure-reduced interior space of the transmission housing is lower since namely conventionally because of the lower density of the medium in the transmission housing a lamination, as has been described above, takes place only to a smaller extent and, as a result, the oil-rich medium can more easily reach the toothings of the spur gears. By means of the covering wall provided according to the invention, the lamination of the media is artificially adjusted and reinforced, even in the event of a pressure in the interior space of the transmission housing lying below the ambient pressure.

According to a second embodiment which is an alternative to the first embodiment of the invention but which may also be combined with the first alternative, a spur gear transmission with at least two toothed spur gears is therefore provided, the toothings of which are in meshing engagement with each other, wherein the two spur gears are each rotatable via an axis of rotation. A covering wall is also provided here which surrounds the two spur gears in the direction of the axes of rotation, wherein the covering wall has an inner contour which is adapted to the outer diameters of the spur gears in such a manner that two annular gaps which merge into each other are produced between the covering wall and the spur gears, wherein one annular gap is at least substantially arranged concentrically with respect to each axis of rotation. The covering wall can now jointly surround the two spur gears in the circumferential direction completely or else only partially, the latter according to the first alternative of the invention. However, in each case, according to the second alternative, in addition to the provision of the covering wall, the interior space of a transmission housing, in which the spur gears are arranged together with the covering wall, is provided with a pressure which is reduced in relation to the ambient pressure, that is to say to the pressure in the outer surroundings of the spur gear transmission outside the transmission housing.

In particular, a distance which is formed by the interior space is provided between the transmission housing and a part of or the entire circumference of the covering wall. At least during the operation of the spur gear transmission, an air-lubricating substance mixture, in particular an air-oil mixture, is present in the interior space, the pressure of which mixture is reduced by, for example, an external or integrated vacuum pump.

According to an advantageous refinement of the invention with partially encapsulated spur gears, that part of the outer circumference of the two spur gears which protrudes out of the covering wall extends over an arc of in each case 10° to 180°, in particular of 90° to 180°, including or excluding the limit values.

For example, that part of the spur gears which protrudes out of the covering wall is positioned on the lower side of the spur gears, with respect to the use of the spur gear transmission as intended.

The annular gaps can have, for example, a thickness of 1 to 10 mm, at least in the part in which the inner contour of the covering wall and the outer diameter of the spur gears are equidistant or concentric with respect to each other.

In a particularly advantageous manner, a side cover is connected to the covering wall on each end side of the spur gears, said side cover covering the end side, wherein the side cover in particular also covers that part of the outer circumference of the respective spur gear which protrudes out of the covering wall, on the end side of said spur gear. If the protruding part is positioned on the lower side of the spur gears, this means that the side cover or the side covers extends/extend further downward than the covering wall.

According to an embodiment of the invention, each spur gear has at least one drive shaft or output shaft which is guided through at least one side cover.

According to an embodiment of the invention, an opening is provided at least in one side cover or in both side covers in the region of the mutual engagement of the toothings of the two spur gears. Said opening can serve, for example, to remove cooling oil from that region of the spur gears which is surrounded by the covering wall, or from the annular gaps.

The cooling oil, in general the cooling medium for the spur gears, can be sprayed, for example, into the tooth entry or preferably tooth exit of the intermeshing toothings. For this purpose, corresponding nozzles can be provided there.

If the covering wall is open downward, the cooling oil can also easily be removed here from the covering wall.

According to an embodiment of the invention, the covering wall is designed to taper in a wedge-shaped manner at at least one circumferential end or at both circumferential ends in the circumferential direction of the spur gears. The formation of a wedge at the circumferential ends causes the flow of the air-lubricating substance mixture to be conducted away from the toothings of the spur gears in the radial direction. It is therefore prevented that medium rich in lubricating substance is sucked into the annular gap. The wedges serve, as it were, as a seal in order to seal the annular gap in relation to the surroundings or in relation to the interior space of the transmission housing. It should be noted in this connection that the spur gears generally rotate toward each other in the region of their circumference covered by the covering wall and rotate away from each other in the region of the circumference not covered by the covering wall.

The covering wall can have cooling. For example, cooling bores for the passage of a cooling medium and/or surface-increasing ribs are provided on the outer side of the covering wall, and/or a cooling medium sprinkling device is provided in order to sprinkle the covering wall from the outside.

According to a particularly advantageous embodiment of the invention, wherein this configuration described below can also be formed independently of the previously mentioned measures, in particular also without the feature that the covering wall surrounds the spur gears only over a part of their circumference, wherein that part of the spur gears which protrudes out of the covering wall is positioned in particular on the lower side of the spur gears, the narrow gap between the covering wall and the spur gears is used for removing heat via the covering wall, and the function of cooling the spur gears is separated from the function of lubricating the spur gears. For example, an active cooling of the covering wall with a cooling medium and the lubrication of the toothings of the spur gears with a lubricating medium can be provided, wherein the cooling medium volume flow is greater than the lubricating medium volume flow, which does not exclude the same medium being used as the cooling medium and the lubricating medium, in particular oil from an oil sump of the spur gear transmission. For example, a first volume flow of the oil sump is conducted through the covering wall and/or over the covering wall as a lubricating medium flow, and a second volume flow of the oil is conducted through the toothings, in particular is sprayed into the tooth entry and/or tooth exit of the intermeshing toothings, in order to ensure the lubrication, wherein the second volume flow is smaller than the first volume flow. For example, the first volume flow—the cooling medium volume flow—is at least twice or three times, in particular five to ten times, the second volume flow, that is to say the lubricating medium volume flow.

In a development of the invention, it can be provided to use a different medium than the lubricating medium as the cooling medium, for example water or a water mixture as the cooling medium and oil as the lubricating medium.

The thickness of the annular gaps is advantageously selected in such a manner that a radial speed component of the medium flowing in the annular gap is reduced. Medium which has already been accelerated in the circumferential direction is intended by the shape of the inner contour of the covering wall to have as constant a speed as possible. In addition, the thickness of the annular gaps should not be selected to be too small since, as the thickness decreases, the relative speeds in the medium increase and therefore the loss rises.

The invention will be described by way of example below with reference to an exemplary embodiment and the figures.

DETAILED DESCRIPTION OF THE INVENTION

Figure 1:
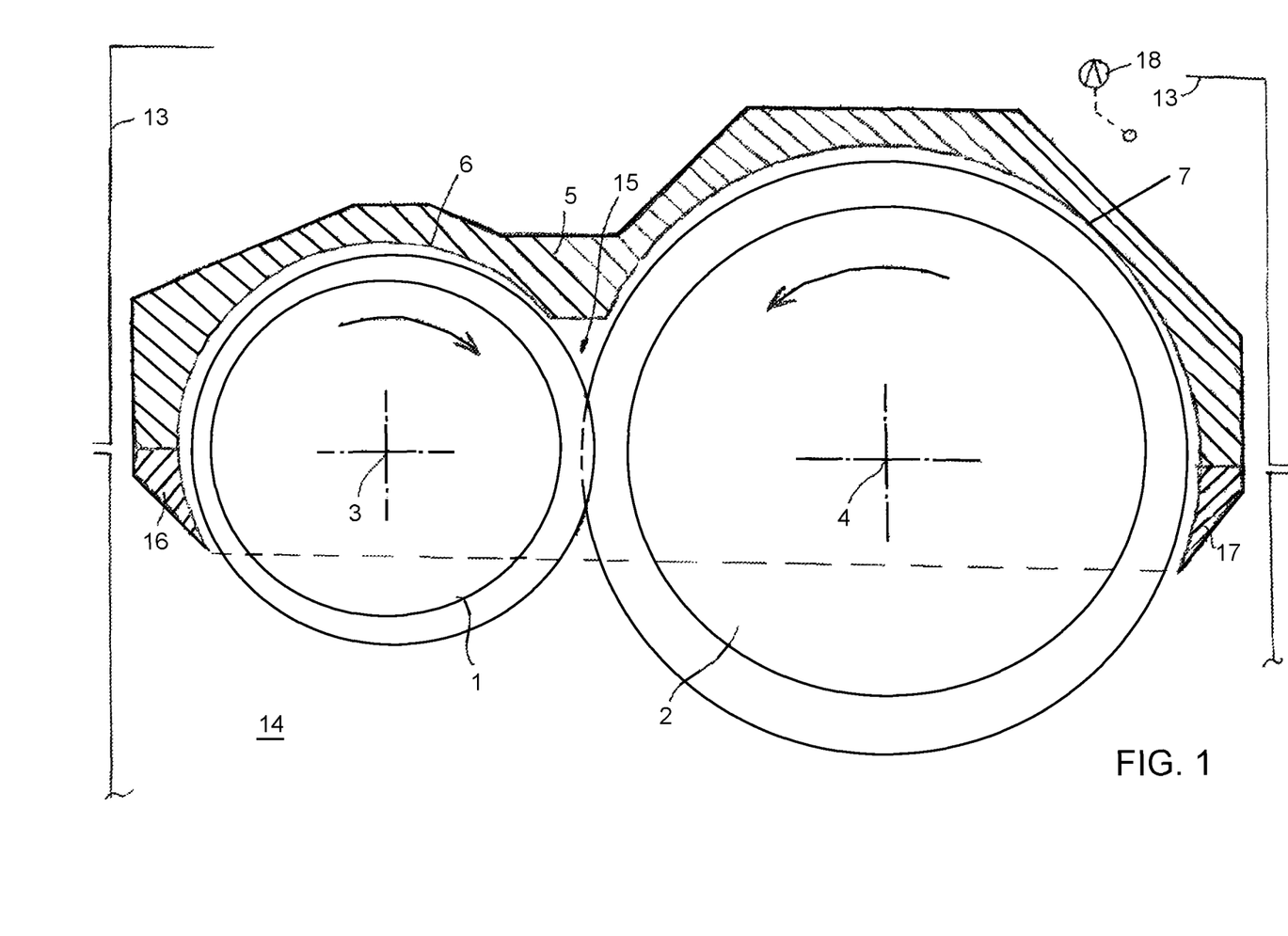
FIG. 1 shows a schematic axial section through a spur gear transmission designed according to the invention with partial encapsulation.

FIG. 1 illustrates a spur gear transmission with a first spur gear 1 and a second spur gear 2, which are designed, for example, as helical or double helical spur gears. As is seen, the toothings of the two spur gears 1, 2 are in meshing engagement with each other, and therefore the first spur gear 1, when it revolves via its axis of rotation 3, drives the second spur gear 2 via its axis of rotation 4, of vice-versa. The direction of rotation of the spur gears 1, 2 is indicated by the arrows.

A covering wall 5 tightly surrounding the spur gears 1, 2 is provided, wherein the covering wall 5, however, extends only over a part of the circumference of the two spur gears 1, 2, and therefore a part of the outer circumference of the spur gears 1, 2 is exposed in relation to an interior space 14 of the transmission housing 13, which is only illustrated schematically here. In the exemplary embodiment shown, the part of the outer circumference of the two spur gears 1, 2 protrudes out of the covering wall 5 on the lower side of the spur gears 1, 2.

In the remaining region of the circumferences of the two spur gears 1, 2, the inner contour of the covering wall 5 together with the outer diameters of the spur gears 1, 2 forms two annular gaps 6, 7 which merge into each other and have a constant thickness over the circumference of the spur gears 1, 2 except for the region of the engagement region 15 of the toothings.

In the exemplary embodiment shown, that part of the outer circumference of the two spur gears 1, 2 which protrudes out of the covering wall 5 extends over in each case an arc of approximately 180°, wherein the difference from 180° is covered by two wedges 16, 17 at the two circumferential ends of the covering wall 5, that is to say the covering wall 5 is designed to taper in a wedge-shaped manner at its two circumferential ends. As can be envisioned because of the indicated directions of rotation of the spur gears 1, 2, said wedge-shaped tapering brings about a diversion of the flow away from the spur gears 1, 2 in the radial direction in the region of entry of the spur gears 1, 2 into the covering wall 5.

The projection surface from which the two spur gears 1, 2 protrude is bounded by the dashed line and the covering wall 5, which is shown in cross section. As is seen, the covering wall 5 therefore not only simply has an opening at the bottom, through which the spur gears 1, 2 are visible from the outside, but the spur gears 1, 2 protrude with their outer circumference out of the covering wall 5.

Within the interior space 14, it is possible to provide at the bottom in the transmission housing 13 a lubricating substance sump or oil sump which is not illustrated specifically here since it is at a corresponding distance from the lower side of the spur gears 1, 2. Furthermore, an extraction device, that is to say a vacuum pump, can be provided which is connected by its suction side to the interior space 14 in order to evacuate the latter by suction. Such a vacuum pump is only illustrated schematically and is denoted by the reference sign 18.

However, the invention can also be realized without such a vacuum pump.

Figure 2:
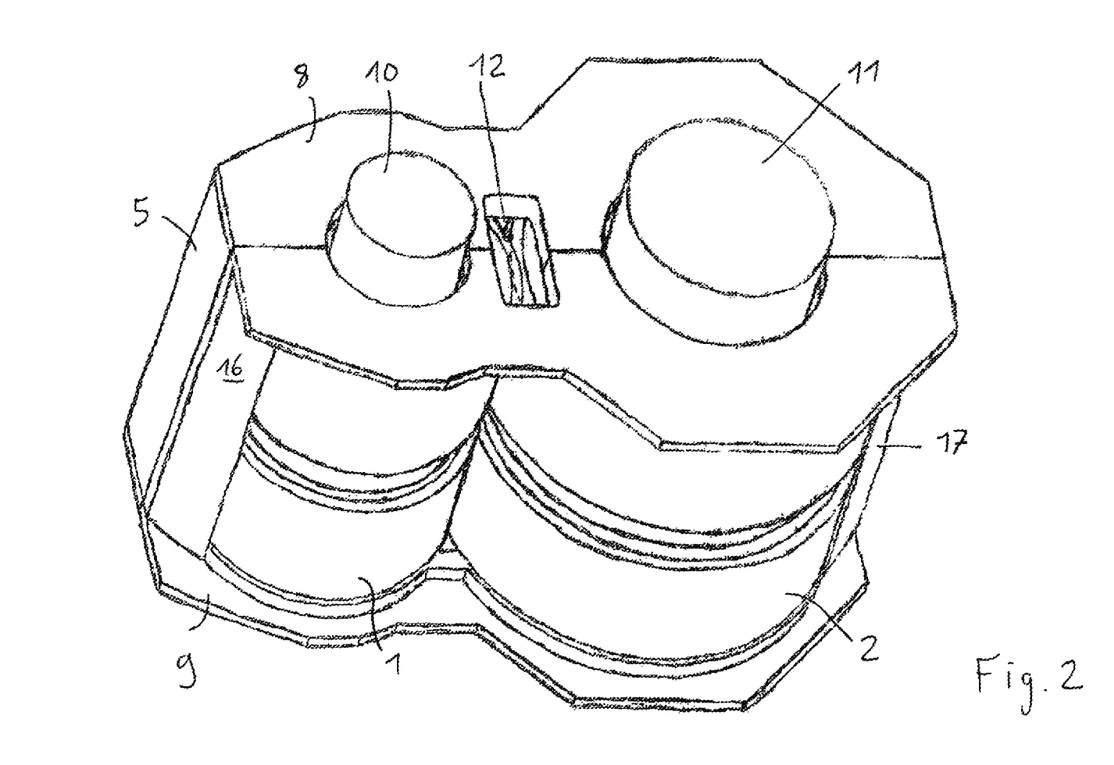
FIG. 2 shows an oblique top view of the partially encapsulated spur gears from FIG. 1.

FIG. 2 illustrates the two side covers 8, 9 connected laterally to the covering wall 5. As is seen, said side covers also cover that part of the outer circumference of the spur gears 1, 2 which protrudes downward out of the covering wall 5.

The first spur gear 1 has a drive shaft 10 and the second spur gear 2 has an output shaft 11. The two shafts 10, 11 are guided through the side covers 8. In the case of a second spur gear 2 which drives the first spur gear 1, the shafts 10, 11 would be correspondingly interchanged.

Furthermore, an opening 12 is provided in the side cover 8 and in particular also in the side cover 9 in the region of the mutual engagement of the toothings of the two spur gears 1, 2. Said opening serves for removing cooling medium.

It is furthermore recognized from FIG. 2 that, in the exemplary embodiment shown, each spur gear 1, 2 has two toothings which are positioned next to each other in the axial direction and in particular at a distance from each other in order to form a double toothing, in particular a double helical toothing.

FIG. 3 once again schematically shows an embodiment of a preferred refinement of a spur gear transmission according to the invention. The covering wall 5 here in each case surrounds the upper half of the two spur gears 1, 2 and therefore ends in a horizontal plane running through the axes of rotation 4, 5, see the dashed line.

Figure 3:
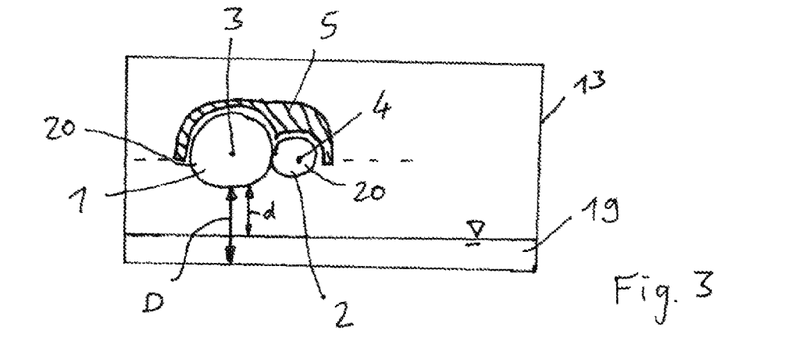
FIG. 3 shows a schematic illustration of a possible partial encapsulation of the spur gears with a transmission housing surrounding the latter.

The oil sump 19 is illustrated schematically at the bottom in the transmission housing 13 which surrounds the two spur gears 1, 2 and the covering wall 5. It is seen that those parts 20 of the spur gears 1, 2 which protrude out of the covering wall 5, that is to say the parts 20 which are positioned below the plane, which is shown by the dashed line and in which the covering wall 5 ends, are at a distance D from the transmission housing 13 and also at a distance d from the oil sump 19, wherein the two spur gears 1, 2 are positioned freely in said region in relation to the oil sump 19, in particular without components which are connected in between and cover the spur gears 1, 2. Lubricating oil can therefore easily be removed from the toothings of the spur gears 1, 2 into the oil sump 19, in particular by means of free spraying.

Figure 4:
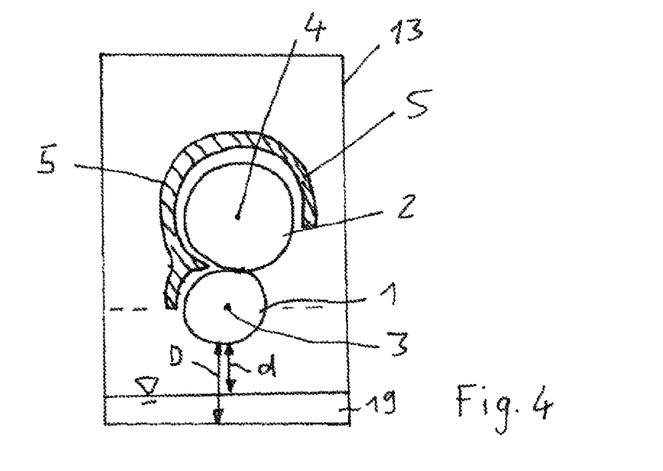
FIG. 4 shows an alternative embodiment to FIG. 3, in which the spur gears are positioned one above the other.

FIG. 4 shows an alternative embodiment in a similar illustration as that of FIG. 3. In a departure, the spur gears 1, 2 are positioned one above the other here. With regard to the components which are illustrated, reference is made to FIG. 3 and to the corresponding reference signs.

In FIG. 4, the upper spur gear, here the second spur gear 2, is surrounded by three quarters, that is to say approximately over 270°, by the covering wall 5, the lower spur gear, here the first spur gear 1, is surrounded over a quarter of its circumference, that is to say over approximately 90°, by the covering wall 5. Accordingly, the lower half of the first spur gear 1 protrudes downward out of the covering wall 5, also see the dashed line here again which shows the plane in which the covering wall 5 ends from above. The distances d, D of the lower spur gear 1 from the oil sump 19 and from the transmission housing 13, respectively, as in the embodiment according to FIG. 3, are also in turn a multiple of the distance between the spur gears 1, 2 and the covering wall 5 in the region of the enclosure or encapsulation.

Figure 5:
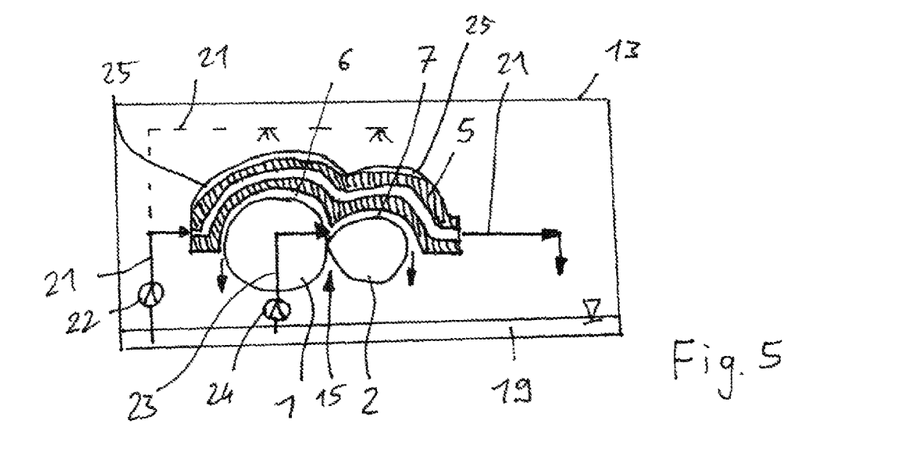
FIG. 5 shows a schematic illustration with the separation of the cooling and lubrication of the spur gears or of the toothings thereof.

FIG. 5 illustrates an aspect of the present invention, namely the separation of the cooling of the spur gears 1, 2 from the lubrication of the spur gears 1, 2. A first oil volume flow for cooling the spur gears 1, 2 is thus conducted through the covering wall 5. Said first oil volume flow is denoted by 21. For the conveying of said first oil volume flow 21, a first oil pump 22 which conveys the oil out of the oil sump 19 is indicated schematically. However, this is not absolutely necessary and a different cooling medium or a different means of conveyance could also be provided. Additionally or alternatively, as indicated by the dashed line, the covering wall 5 can also be cooled by sprinkling with the first oil volume flow 21.

In order to lubricate the spur gears 1, 2, a second oil volume flow 23 is conducted into the toothings of the spur gears 1, 2, advantageously into the engagement region 15 of the toothings, for example through one or more openings 12, as is illustrated in FIG. 2. Said second oil volume flow 23 is conveyed out of the oil sump 19, for example by means of a second oil pump 24. However, a different conveying means or a different source also comes into consideration here.

The first oil volume flow 21 and the second oil volume flow 23 can also be conveyed by means of a common oil pump, wherein, in all cases, however, the first oil volume flow 21 is advantageously larger than the second oil volume flow 23, in particular is a multiple thereof.

The second oil volume flow 23 can advantageously spray freely from the spur gears 1, 2, whereas the first oil volume flow 21 as a rule emerges from the covering wall 5 from at least one corresponding opening or, in the event of sprinkling of the covering wall 5, runs or drips off from the covering wall 5.

By means of the active cooling of the covering wall 5, in contrast to direct cooling, the spur gears 1, 2 can be cooled indirectly by transmission of heat into the covering wall 5 via the annular gaps 6, 7. This makes it possible for a comparatively small lubricating oil volume flow, here second oil volume flow 23, to be conveyed through the annular gaps 6, 7 and/or the engagement region 15 of the toothing, which reduces the losses.

In the exemplary embodiment shown, cooling of the covering wall 5 by cooling ribs 25 on the outside of the covering wall 5 is furthermore schematically shown.

According to an embodiment of the invention, it could be sufficient to cool the covering wall 5 only by means of the at least one cooling rib 25 and nevertheless to remove a greater heat flow via the covering wall 5 than via the cooling medium flow, here the second oil volume flow 23, which is conducted through or along the toothing, in particular through the annular gaps 6, 7.

The invention claimed is:

1. A spur gear transmission, comprising:
at least two toothed spur gears rotatably disposed about respective axes of rotation and formed with toothings in meshing engagement with each other;
a covering wall surrounding said two spur gears circumferentially and in a direction of said axes of rotation;
said covering wall having an inner contour adapted to outer diameters of said spur gears to form two annular gaps between said covering wall and said spur gears that merge into one another, with one said annular gap being at least substantially concentric with respect to each axis of rotation;
said covering wall surrounding said two spur gears circumferentially only over a part of the circumference thereof such that a part of an outer circumference of said two spur gears or of at least one of said two spur gears protrudes outward out of said covering wall, and wherein said part of the outer circumference of said two spur gears or of at least one of said two spur gears that protrudes outward is located on a lower side of said spur gears;
said covering wall being a cooled covering wall with cooling means configured to remove a greater heat flow from said spur gears and/or said toothings of said spur gears than with a lubricant flow that lubricates the meshing engagement of said toothings and which flows through said annular gaps.

2. The spur gear transmission according to claim 1, wherein said part of the outer circumference of said two spur gears which protrudes out of said covering wall extends over an arc of 10° to 180° in each case.

3. The spur gear transmission according to claim 2, wherein each said part that protrudes out of said covering wall extends over an arc of 90° to 180°.

4. The spur gear transmission according to claim 1, which further comprises a transmission housing having an interior space filled with an air-lubricant mixture, and wherein said spur gears together with the covering wall are disposed in said interior space, and at a spacing distance from said covering wall over a part of or an entire circumference of said covering wall.

5. The spur gear transmission according to claim 1, wherein said annular gaps have a width of 1 to 10 mm.

6. The spur gear transmission according to claim 1, which further comprises a side cover connected to said covering wall on each end side of said spur gears, said side cover covering each end side and also covering that part of the outer circumference of the respective said spur gear which protrudes out of said covering wall, on an end side of said spur gear.

7. The spur gear transmission according to claim 6, wherein each said spur gear has at least one drive shaft or output shaft which is guided through at least one of said side covers.

8. The spur gear transmission according to claim 6, wherein at least one of said side covers or both of said side covers are formed with an opening in a region of the meshing engagement of the toothings of said spur gears.

9. The spur gear transmission according to claim 1, wherein said covering wall is formed to taper in a wedge shape at at least one circumferential end or at both circumferential ends in the circumferential direction of said spur gears, and/or is arranged at a smaller distance in relation to the toothing of the respective said spur gear than in a remaining region of the circumference covered by said covering wall.

10. The spur gear transmission according to claim 1, wherein said cooling means is at least one device selected from the group consisting of cooling bores for a passage of a cooling medium, surface-increasing ribs on an outer side, and a coolant sprinkling device.

11. The spur gear transmission according to claim 4, wherein said interior space is subject to a reduced pressure in relation to an exterior of the spur gear transmission.

12. The spur gear transmission according to claim 11, which further comprises a vacuum pump having a suction side connected to said interior space for evacuating said interior space by suction.

13. The spur gear transmission according to claim 1, wherein said at least two spur gears are positioned next to one other with said two axes of rotation in a common horizontal plane.

14. The spur gear transmission according to claim 1, wherein said lubricant is lubricating oil.

15. The spur gear transmission according to claim 1, wherein a first oil volume flow for cooling said covering wall is conducted through and/or over said covering wall, and a second oil volume flow is conducted through said toothings of said spur gears, and said first oil volume flow is greater than said second oil volume flow.

16. The spur gear transmission according to claim 15, wherein said second oil volume flow is conducted through said annular gaps, and wherein said first oil volume flow is greater than said second oil volume flow by a multiple thereof.

17. The spur gear transmission according to claim 15, which further comprises an oil sump positioned within or outside a transmission housing that surrounds said spur gears and said covering wall, and wherein said first oil volume flow and said second oil volume flow are conveyed out of said oil sump and are conducted back into said oil sump.

18. The spur gear transmission according to claim 1, wherein said part of the outer circumference of said two spur gears which protrudes out of said covering wall extends over an arc of 10° to 180° in each case, said at least two spur gears are positioned next to one other with said axes of rotation in a common horizontal plane.

19. The spur gear transmission according to claim 18, wherein said covering wall is a cooled covering wall having cooling means selected from the group consisting of cooling bores for a passage of a cooling medium, surface-increasing ribs on an outer side and a coolant sprinkling device.

20. The spur gear transmission according to claim 19, wherein said cooling means of said covering wall is configured to remove a greater heat flow from said spur gears and/or said toothings of said spur gears than with a lubricant flow that lubricates the meshing engagement of said toothings and which flows through said annular gaps.

21. The spur gear transmission according to claim 1, wherein said covering wall is a cooled covering wall having cooling means selected from the group consisting of cooling bores for a passage of a cooling medium, surface-increasing ribs on an outer side and a coolant sprinkling device, and said cooling means of said covering wall is configured to remove a greater heat flow from said spur gears and/or said toothings of said spur gears than with a lubricant flow that lubricates the meshing engagement of said toothings and which flows through said annular gaps.

22. The spur gear transmission according to claim 21, wherein a first oil volume flow for cooling said covering wall is conducted through and/or over said covering wall, and a second oil volume flow is conducted through said toothings of said spur gears, and said first oil volume flow is greater than said second oil volume flow.

23. The spur gear transmission according to claim 1, wherein said covering wall is a cooled covering wall having cooling means selected from the group consisting of cooling bores for a passage of a cooling medium, surface-increasing ribs on an outer side and a coolant sprinkling device, and wherein said at least two spur gears are positioned next to one other with said axes of rotation in a common horizontal plane.

24. The spur gear transmission according to claim 1, wherein:
said part of the outer circumference of said two spur gears which protrudes out of said covering wall extends over an arc of 10° to 180° in each case;
said covering wall is formed to taper in a wedge shape at at least one circumferential end or at both circumferential ends in the circumferential direction of said spur gears, and/or is arranged at a smaller distance in relation to the toothing of the respective said spur gear than in a remaining region of the circumference covered by said covering wall; and
said cooling means of said covering wall are selected from the group consisting of cooling bores for a passage of a cooling medium, surface-increasing ribs on an outer side and a coolant sprinkling device.

25. The spur gear transmission according to claim 24, wherein said at least two spur gears are positioned next to one other with said axes of rotation in a common horizontal plane.

26. The spur gear transmission according to claim 25, wherein said cooling means of said covering wall is configured to remove a greater heat flow from said spur gears and/or said toothings of said spur gears than with a lubricant flow that lubricates the meshing engagement of said toothings and which flows through said annular gaps.

* * * * *